United States Patent [19]

Moore, Jr. et al.

[11] 4,397,296
[45] Aug. 9, 1983

[54] WATER HEATER WITH SUBMERGED COMBUSTION CHAMBER

[75] Inventors: Henry J. Moore, Jr., Los Angeles; Lindy J. Bressickello, Baldwin Park, both of Calif.

[73] Assignee: Mor Flo Industries, Inc., Santa Monica, Calif.

[21] Appl. No.: 327,765

[22] Filed: Dec. 7, 1981

Related U.S. Application Data

[63] Continuation-in-part of Ser. No. 159,180, Jun. 13, 1980, Pat. No. 4,328,791.

[51] Int. Cl.³ .............................. F24H 1/20; F22B 5/00
[52] U.S. Cl. .................................... 126/360 A; 122/17
[58] Field of Search ........... 126/366, 368, 378, 360 R, 126/360 A; 122/13 R, 16–18

[56] References Cited

U.S. PATENT DOCUMENTS 2,888,911 6/1959 Thompson .......................... 122/17
4,301,772 11/1981 Eising .................................. 122/17

FOREIGN PATENT DOCUMENTS 714242 11/1931 France ................................. 122/17

Primary Examiner—Samuel Scott
Assistant Examiner—G. Anderson
Attorney, Agent, or Firm—Ralph B. Pastoriza

[57] ABSTRACT

The water heater has a totally submerged combustion chamber disposed within the lower third portion of the tank. Top and side openings connect respectively to an upwardly extending flue pipe and an inlet side cylinder to provide an air and gas passage through the tank in heat exchange relationship with water. A gas burner is receivable in the combustion chamber and is operated by a thermostat to assure a continuous supply of hot water. The totally submerged combustion chamber itself is solely supported by the flue pipe and side inlet cylinder.

5 Claims, 3 Drawing Figures

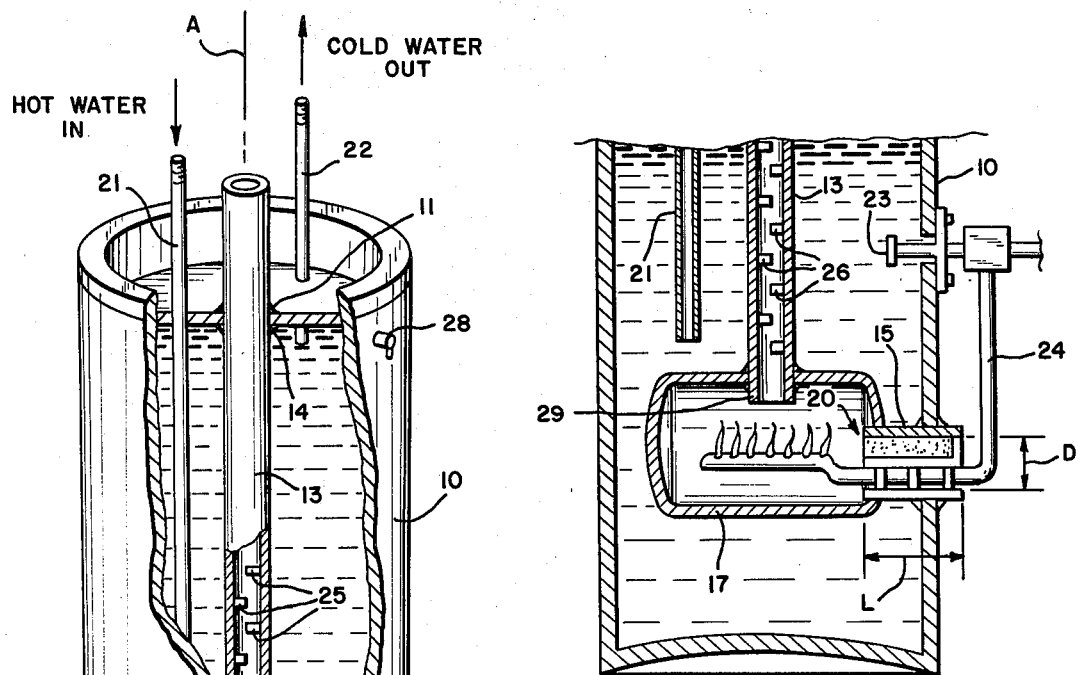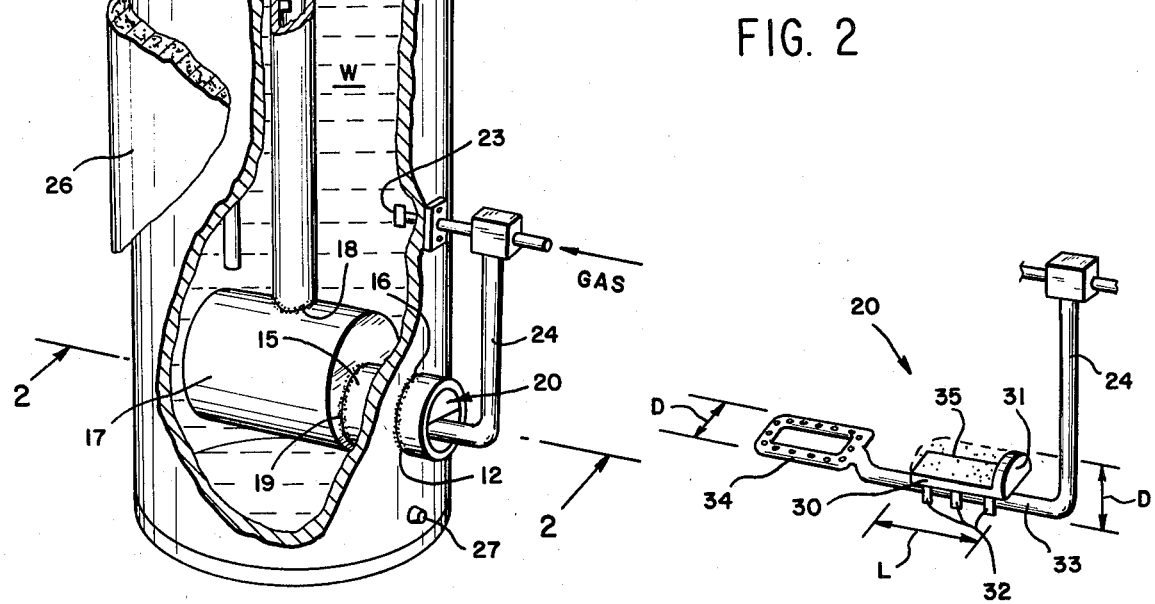

WATER HEATER WITH SUBMERGED COMBUSTION CHAMBER

This application is a continuation-in-part of our co-pending patent application, Ser. No. 159,180 filed Jun. 13, 1980 and entitled GAS SUPPLEMENTED SOLAR COLLECTOR STORAGE MEANS now U.S. Pat. No. 4,328,791, issued May 11, 1982.

FIELD OF THE INVENTION

This invention relates generally to hot water heaters and more particularly to an improved residential type gas operated water heater incorporating an improved combustion chamber providing for increased efficiency in heating of water in the tank.

BACKGROUND OF THE INVENTION

Conventional hot water heaters of the gas operated type normally incorporate a heater assembly at the bottom of the tank to heat water in the tank. As a result, there is normally a loss of heat from the combustion chamber through the sides and bottom of the chamber. Also, there may result a substantial heat loss up through the flue pipe for the gas heater.

BRIEF DESCRIPTION OF THE PRESENT INVENTION

With the foregoing in mind, the present invention contemplates the provision of an improved gas heating means for residential type water heaters wherein heat loss from the combustion chamber is minimized with the result that substantially more heat generated by the chamber is transferred to water in the tank.

More particularly, the water heater of the present invention comprises a water tank having cold water inlet and hot water outlet connections and a gas heating means in the form of a combustion chamber in the tank in a position to be totally submerged in water in the tank, the combustion chamber having side and top openings. A flue pipe passes from the top of the tank to connect to the top opening of the combustion chamber and an inlet cylinder passes from a side of the tank to connect to the side opening of the combustion chamber. A gas burner means is receivable through the inlet cylinder into the combustion chamber and connected for operation by an appropriate thermostat. Heat exchange with water surrounding the chamber, flue pipe and inlet cylinder will thus take place. The flue pipe and inlet cylinder serve the additional function of constituting the sole support for the combustion chamber in the tank so that the same can be supported in a wholly submerged position.

BRIEF DESCRIPTION OF THE DRAWINGS

A better understanding of this invention will be had by now referring to the accompanying drawings in which:

FIG. 1 is a cut-away perspective view of the water heater of this invention;

FIG. 2 is a fragmentary cross section taken in the direction of the arrows 2—2 of FIG. 1; and FIG. 3 is a perspective view of the gas burner means separated from the combustion chamber.

DETAILED DESCRIPTION OF THE PREFERRED EMBODIMENT

Referring first to FIG. 1, the water heater includes a vertical cylindrical water tank 10 having a top opening 11 coaxial with its vertical cylindrical axis designated A. Tank 10 also includes a side opening located in its lower side wall as at 12.

A vertical open-ended cylindrical flue pipe 13 within the tank 10 has an upper end passing through and being secured to the periphery of the top opening 11 as at 14. The flue pipe 13 is thus supported by the tank 10 at the point where it passes through the opening 11.

An horizontal inlet cylinder 15, in turn, as an outer end passing through and secured to the periphery of the side opening 12 as at 16 so as to be supported by the tank 10.

As shown in the lower cut-away portion in FIG. 1, there is provided a combustion chamber 17 having a top opening 18 and a side opening 19 receiving, respectively, the lower end of the flue pipe 13 and the inner end of the inlet cylinder 15 in sealingly secured relationship so that a waterproof air passage is defined through the inlet cylinder into the combustion chamber and out of the flue pipe. Moreover, with this arrangement, the combustion chamber is supported relative to the tank wholly by the flue pipe 13 and inlet cylinder 15 in a position so as to be totally submerged in water in the tank. In FIG. 1, water is indicated by the letter W in the interior of the tank and it will be appreciated that the water entirely surrounds the combustion tank 17 as well as that portion of the flue pipe 13 and inlet cylinder 15 passing within the tank 10.

A gas burner means designated generally by the arrow 20 is receivable through the inlet cylinder 15 so as to be positioned within the combustion chamber 17. Appropriate cold water inlet and hot water outlet pipes for passing water into the lower half of the tank and passing water out from the upper half of the tank are illustrated at 21 and 22.

Control of the water temperature is accomplished by an appropriate thermostat indicated at 23 in the side wall of the tank connected to turn on the gas burner means 20 whenever the temperature of water in the tank falls below a given minimum temperature set in the thermostat and to turn off the gas burner means whenever the temperature of the water rises above a given maximum temperature set in the thermostat. As indicated in FIG. 1, the thermostat 23 connects to control the gas flow in gas line 24 passing to the gas burner means 20.

In the preferred embodiment of the invention as illustrated in FIG. 1, the combustion chamber 17 is disposed in the lower third of the tank 10. This positioning in the lower portion of the tank will provide a fairly long length for the flue pipe 13 so that good heat exchange can take place with the water surrounding the pipe 13. The combustion chamber 17, however, is still supported above the floor of the tank so as to be wholly surrounded by water as described.

To increase further the effectiveness of the flue pipe itself as a heater for the water, and as shown in the broken away portion of FIG. 1, the pipe includes baffling means 25 to provide an increase in back pressure over that which would exist in the absence of the baffling means. As a consequence, there is an increased retention of heat in both the chamber and the flue pipe when the gas burner means is on.

The preferred embodiment of the water heater illustrated in FIG. 1 is completed by the provision of an insulation jacket 26 surrounding the water tank and an appropriate drain plug 27 in the lower portion of the tank. Also as shown in the upper portion of the tank there may be provided a pressure relief valve 28 for safety purposes.

It should be understood that while the insulation jacket 26 can be added to the tank 10, insulation in the form of foam itself can be incorporated on the outer surface of the tank 10 as a permanent part of the tank. In either event, the provision of such insulation material will provide for increased retention of heat in the water.

Referring now to FIG. 2, further details of the combustion chamber and gas burner means will be described as well as further features of the invention.

First, it will be noted that the interior dimensions of the chamber 17 are greater than either of the diameters of the flue pipe 13, and the inlet cylinder 15, thereby providing an acoustic impedance to air and gas flow and avoiding acoustic resonances. As a consequence, the heater will operate in a quiet manner.

Furthermore, the lower interior end of the flue pipe 13 extends into the interior of the chamber a given distance as indicated at 29 thereby providing a further increase in the impedance of air and gas flow from the chamber to the exterior. This additional impedance inhibits resonances. In this respect the inlet cylinder 15 also extends into the side of the combustion chamber 17 a short distance to serve the same function.

Referring specifically to FIG. 3, there is illustrated the gas burner means 20 separated from the combustion chamber. In this respect, an important feature of this invention resides in the ability to remove the gas heater means as a unit from the combustion chamber through the inlet cylinder 15. Such is accomplished by designing the gas burner means as specifically illustrated in FIG. 3. Thus, the burner means includes a rectangular body 30 of width W and length L corresponding to the inside diameter and length of the inlet cylinder 15, respectively. Body 30 further includes an upturned outer end 31 of semi-circular shape dimensioned to fit in the upper half of the outer end of the inlet cylinder 15. Appropriate supports such as indicated at 32 extend from the underside of the body 30 for supporting a gas line 33 connecting from the gas line and extending along the underside of the body 30. Gas line 33 terminates in a gas flame burner ring 34. Fiberglass insulation 35 may be provided on the top side of the body 30.

With the foregoing construction and by designing the burner ring 34 to have an overall width no greater than the diameter D of the inside of the inlet cylinder 15 as illustrated in FIG. 2, the entire body, supports and gas line with the burner ring are slidable as a unit into the inlet cylinder. The gas line and burner are held in a central consistent position against yawing movement as a result of engagement and support of the long sides of the rectangular body 30 with and by the inner diametrically opposite surfaces of the inlet cylinder 15.

The foregoing arrangement provides for a very advantageous water heater system in that the gas burner means itself can be easily separated from the combustion chamber in the tank without having to dismantle any of the basic tank components.

From all of the foregoing, it will be evident that the present invention has provided a greatly improved water heater wherein greater efficiency is realized than has been possible with prior art gas-heated water tanks.

Again, the essence of the invention resides in the provision of the wholly submerged combustion chamber in combination with the flue pipe for effecting a maximum transfer of heat to the surrounding water.

Various changes falling within the scope and spirit of this invention will occur to those skilled in the art. The water heater, accordingly, is not to be thought of as limited by all of the specific preferred constructional features set forth.

We claim:

1. A water heater including, in combination:
   (a) a vertical cylindrical water tank having a top opening coaxial with its vertical cylindrical axis and a side opening in its side wall;
   (b) a vertical open-ended cylindrical flue pipe within said tank, the upper end of said pipe passing through and being secured to the periphery of said top opening so as to be supported by said tank;
   (c) an horizontal inlet cylinder having an outer end passing through and secured to the periphery of said side opening so as to be supported by said tank;
   (d) a combustion chamber disposed within said tank and having a top opening and a side opening receiving, respectively the lower end of said flue pipe and the inner end of said inlet cylinder in sealingly secured relationship so that a waterproof air passage is defined through said inlet cylinder into the combustion chamber and out of the flue pipe and so that said combustion chamber is supported relative to the tank wholly by said flue pipe and inlet cylinder in position so as to be totally submerged in water in the tank, the interior dimensions of the chamber being greater than either of the diameters of the flue pipe and the inlet cylinder to provide an acoustic impedance to air and gas flow and thereby avoid acoustic resonances;
   (e) a gas burner means receivable through said inlet cylinder into said chamber said gas burner means including a body of width and length corresponding to the inside diameter and length of said inlet cylinder, said body having an upturned outer end of semi-circular shape dimensioned to fit in the upper half of the outer end of said inlet cylinder; supports extending from the underside of said body, a gas line extending along the underside of said body secured to said supports and terminating in a gas flame burner ring, and fiberglass insulation material on the top side of said body, said entire body, supports and gas line being slidable as a unit into said inlet cylinder, the gas line and burner being held in a central consistent position against yawing movement by engagement and support of the long sides of said rectangular body with inner diametrically opposite surfaces of said inlet cylinder;
   (f) a cold water inlet for passing water into the lower half of the tank;
   (g) a hot water outlet for passing water out from the upper half of the tank; and
   (h) a thermostat in the side wall of the tank connected to turn on the gas burner means whenever the temperature of water in the tank falls below a given minimum temperature set in the thermostat and to turn off the gas burner means whenever the temperature of water rises above a given maximum temperature set in the thermostat.

2. The subject matter of claim 1, in which said combustion chamber is positioned in the lower third of said tank.

3. The subject matter of claim 1, including gas flow baffling means in said flue pipe to provide an increased back pressure over that which would exist in the absence of the baffling means to thereby increase the retention of heat in the chamber and flue pipe when said gas burner means is on.

4. The subject matter of claim 1, including an insulation jacket surrounding said water tank, said tank having a bottom drain plug in a lower side portion.

5. The subject matter of claim 1, in which the lower end of said flue pipe extends into the interior of said chamber a given distance to increase the impedance of air and gas flow from the chamber to the exterior.

* * * * *